Figure 1:
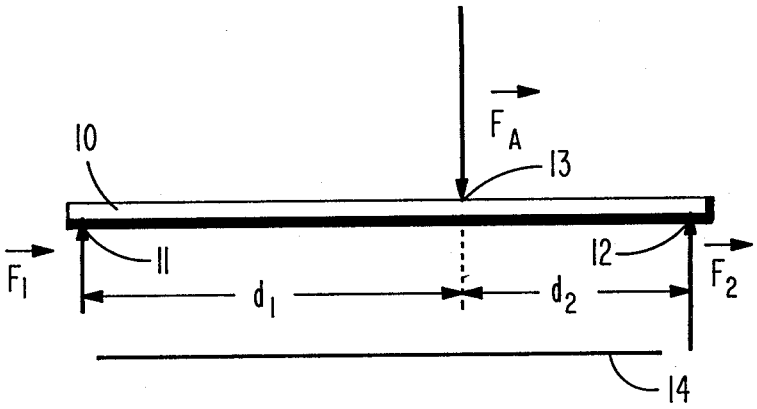
Figure 2:
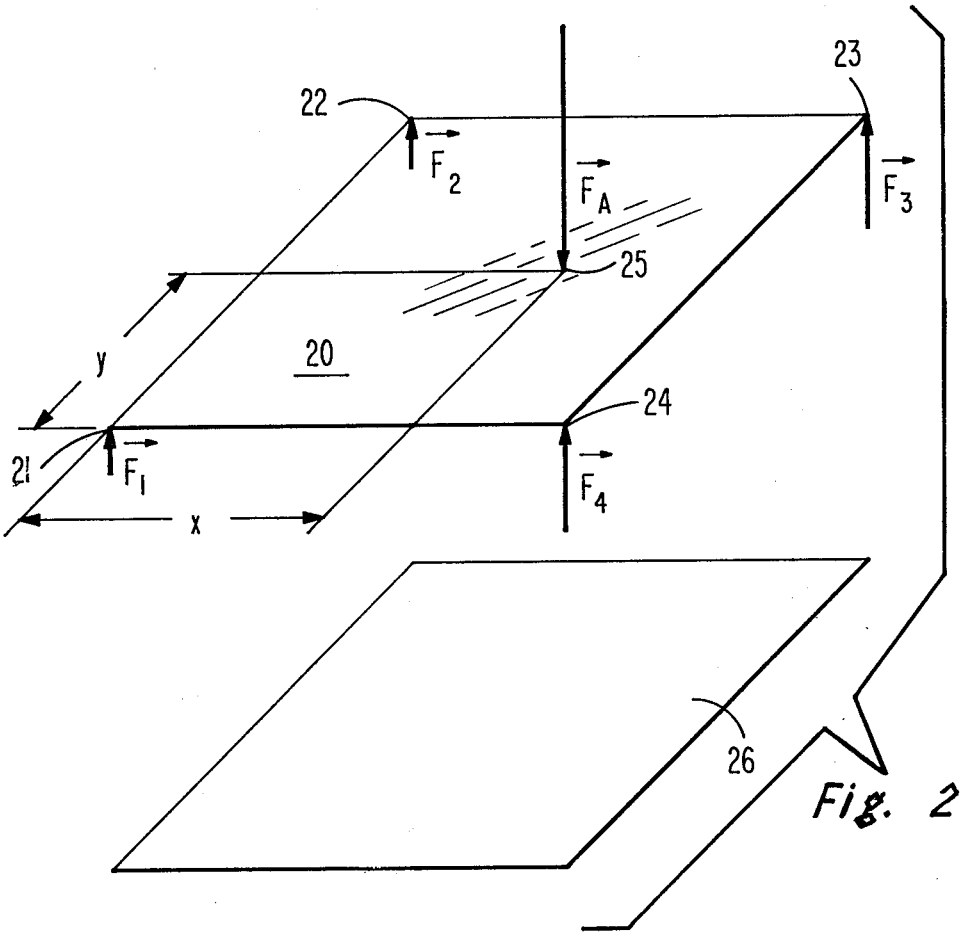
Figure 3:
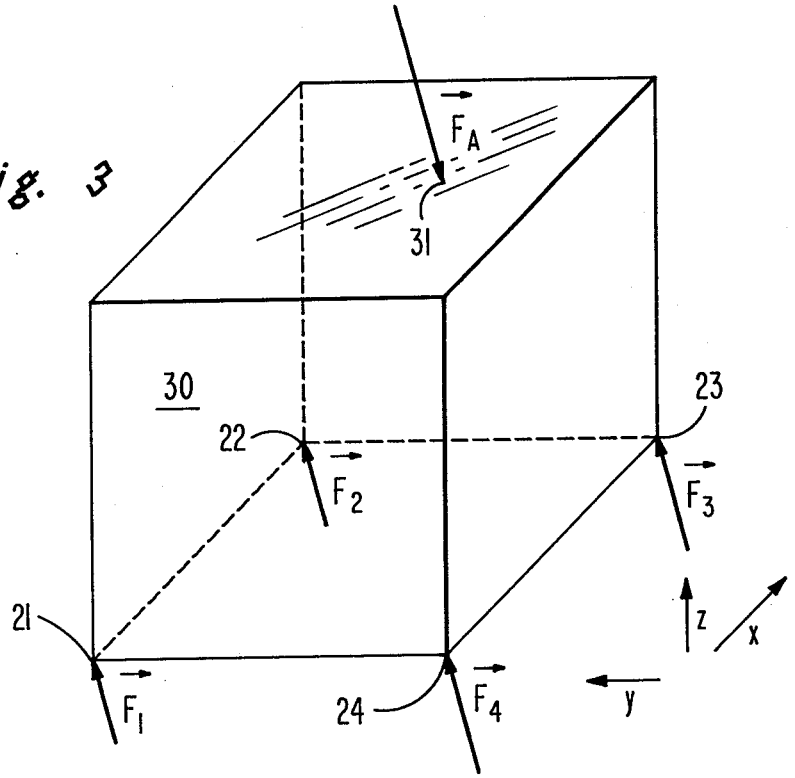
Figure 4:
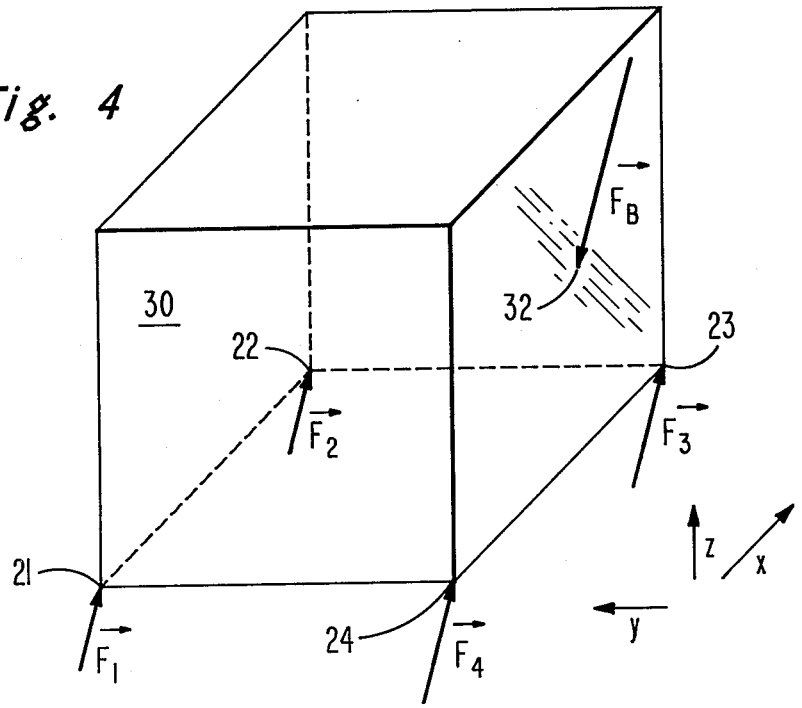
Figure 5:
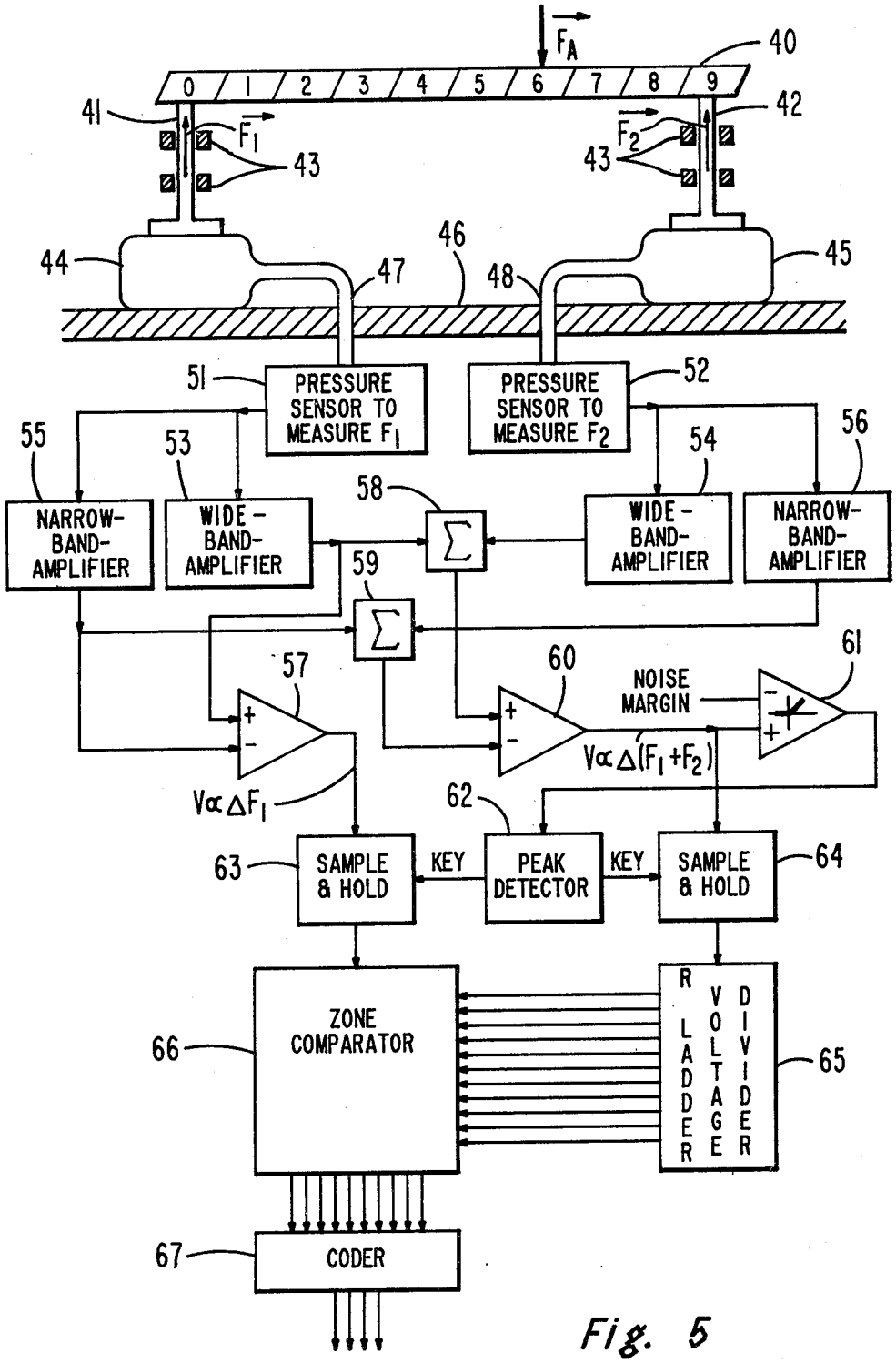
Figure 6:
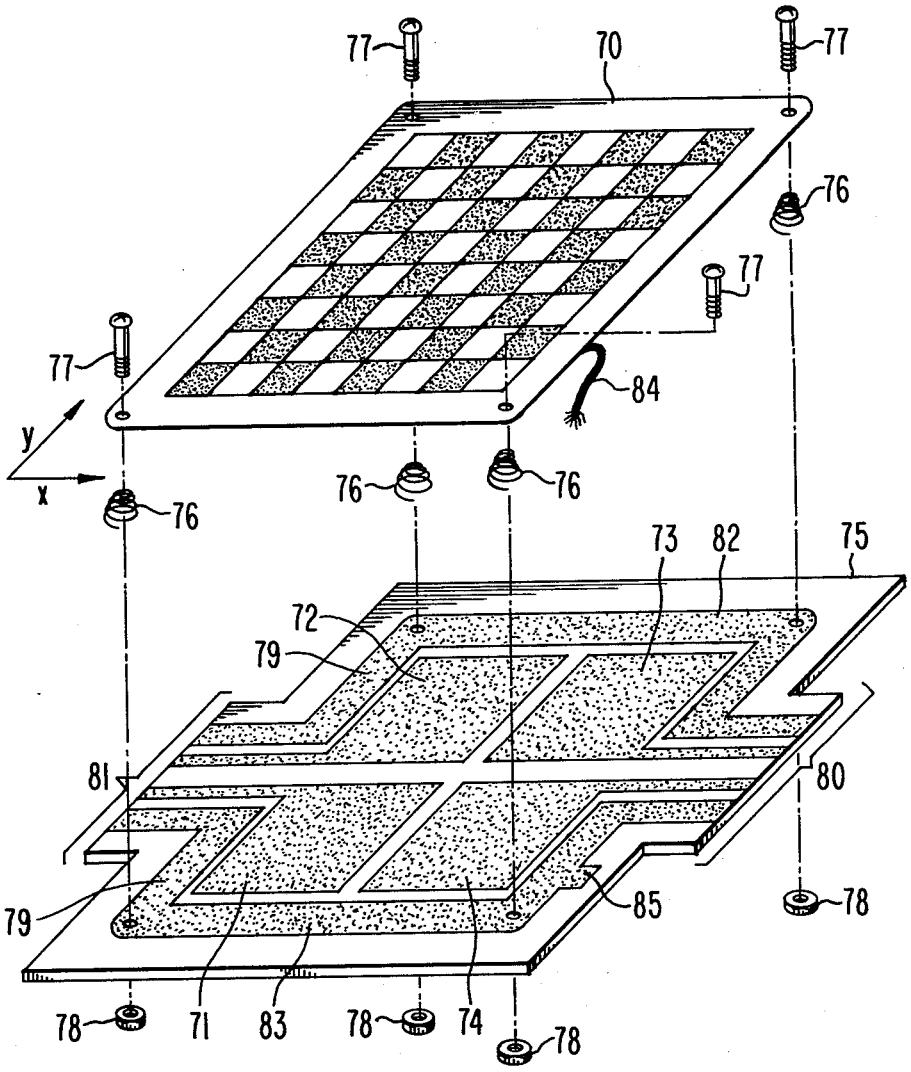
Figure 7:
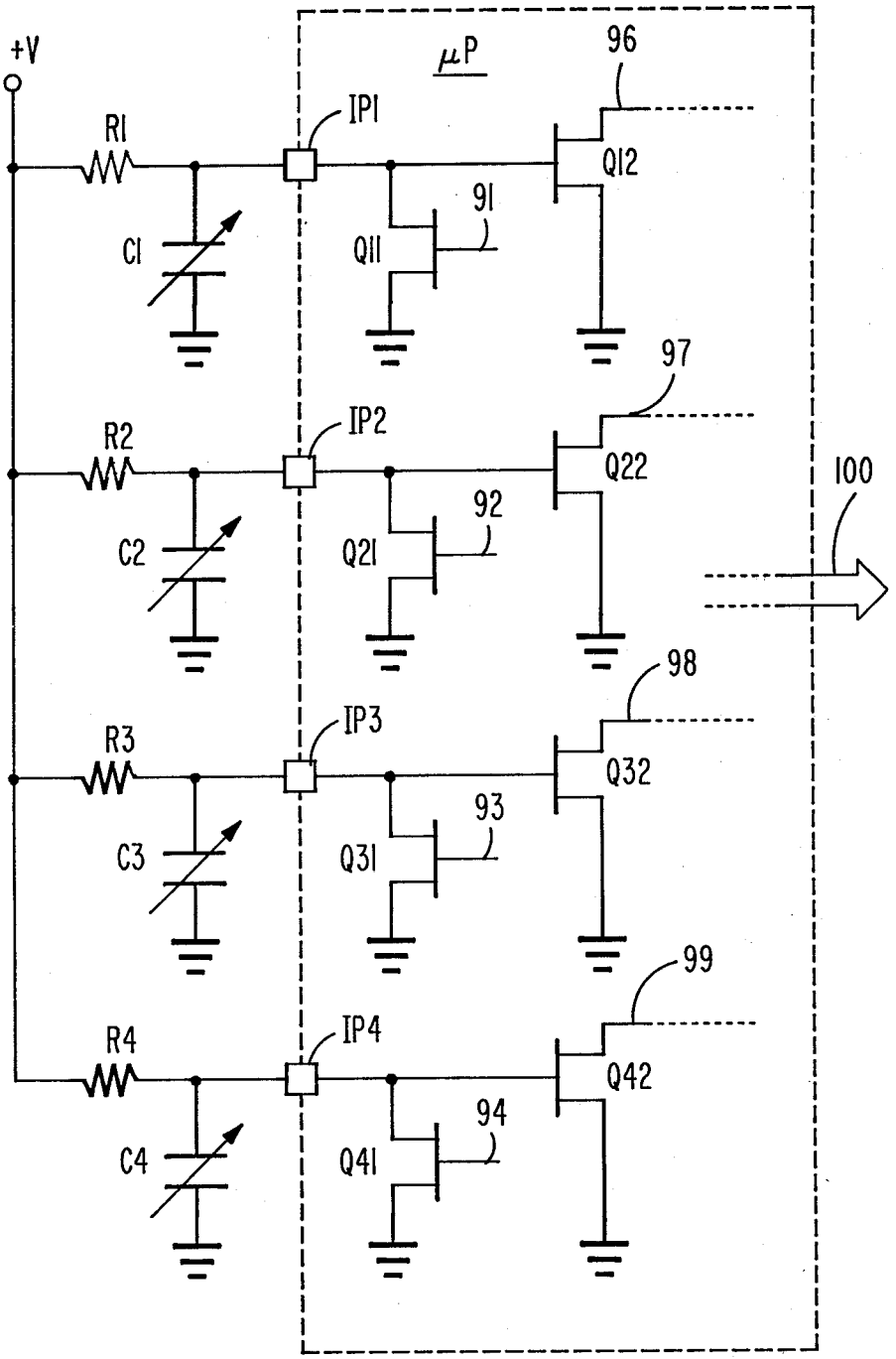
Figure 8:
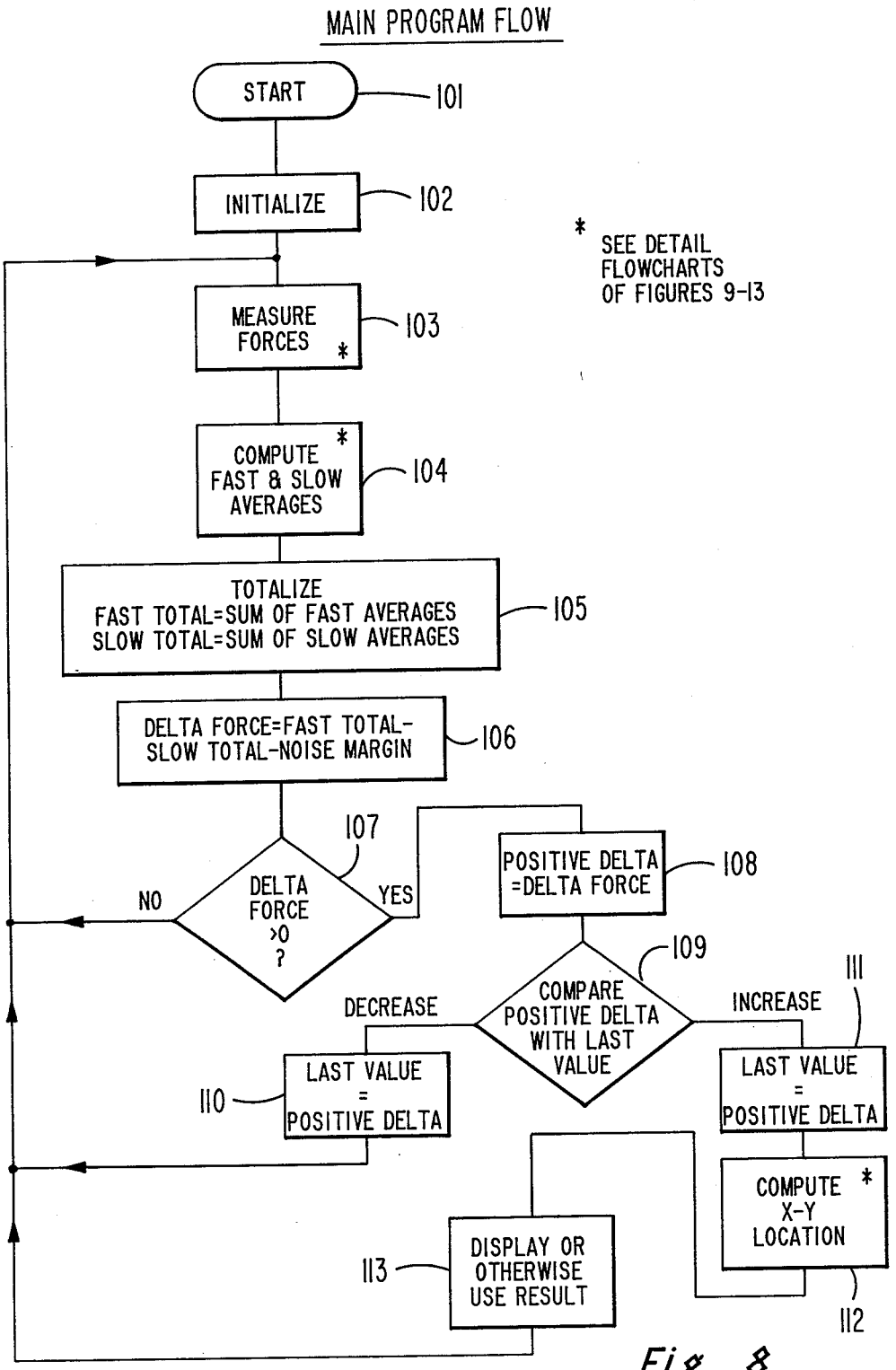
Figure 9:
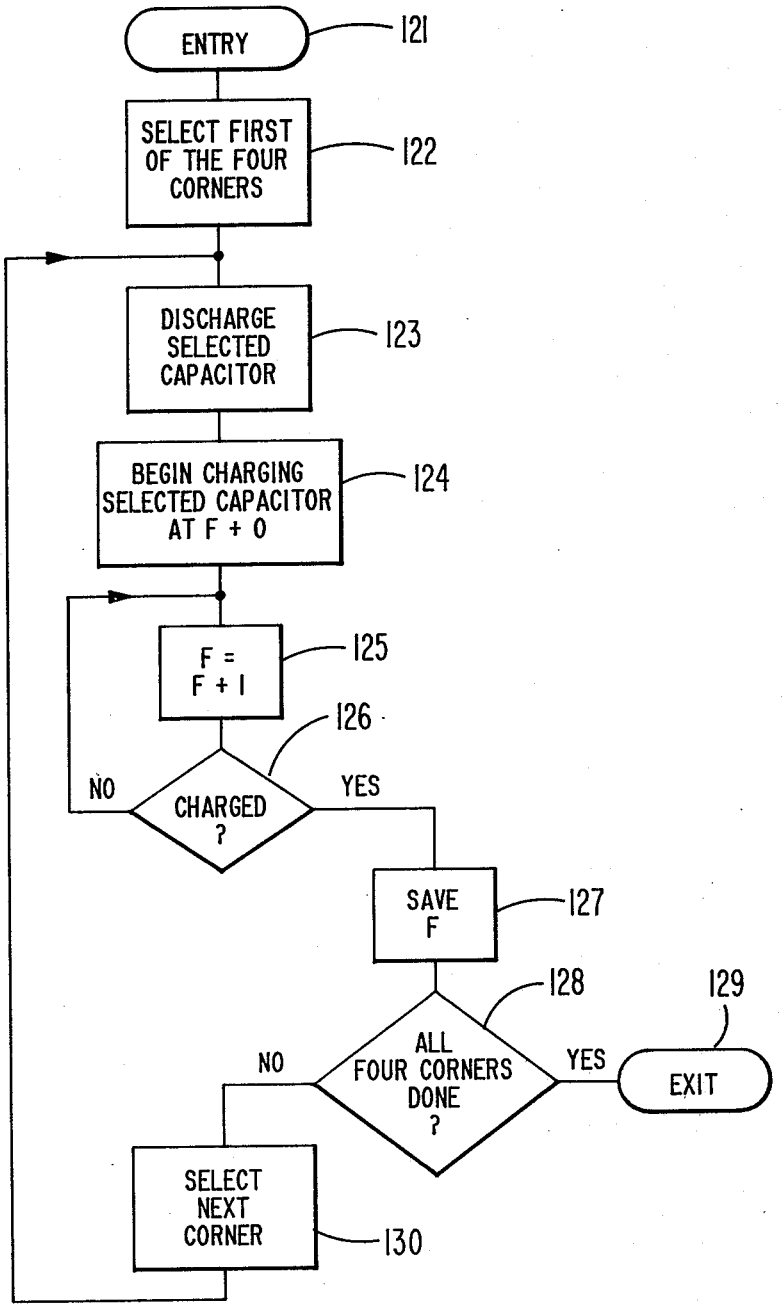
Figure 10:
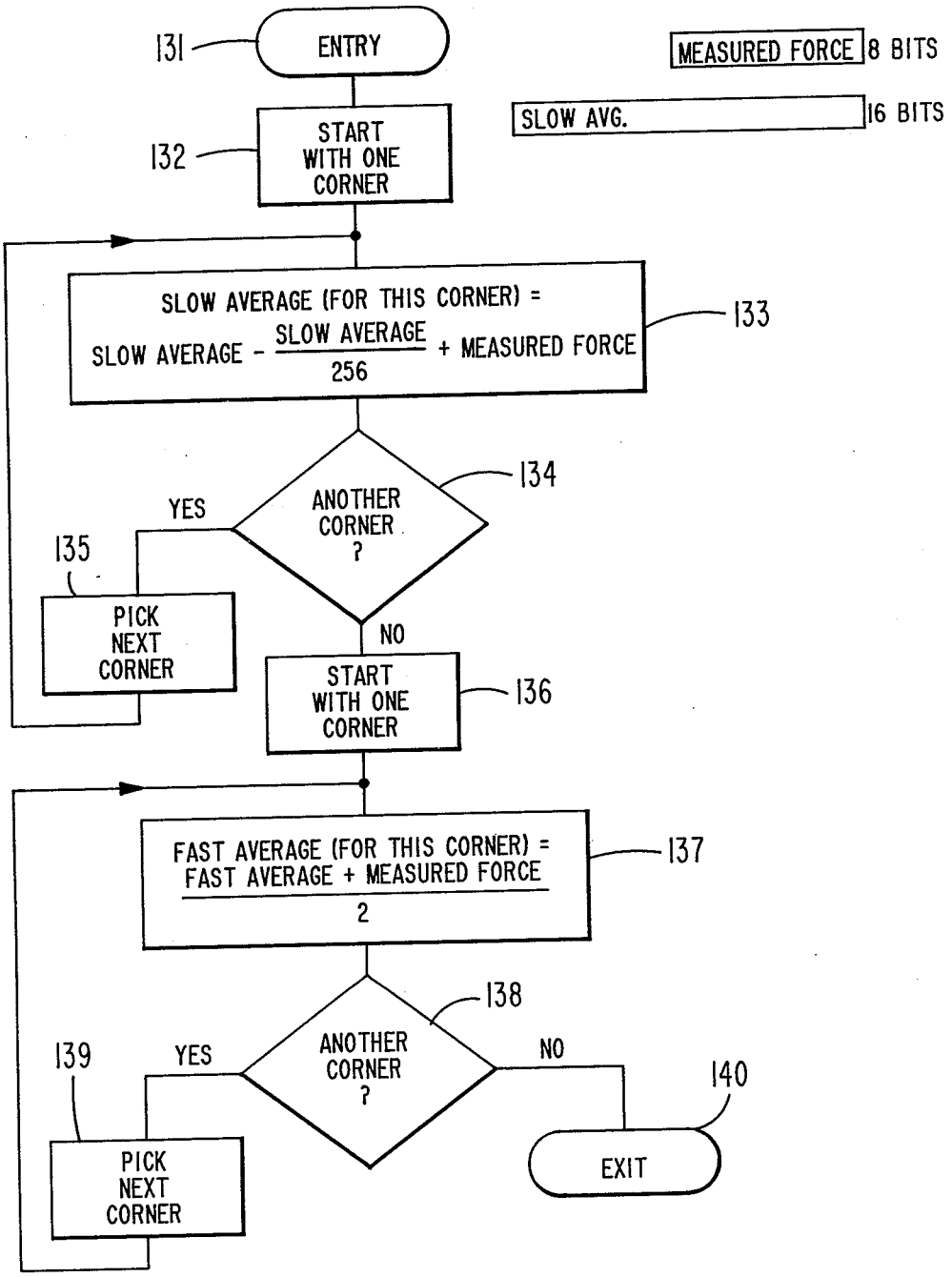
Figure 11:
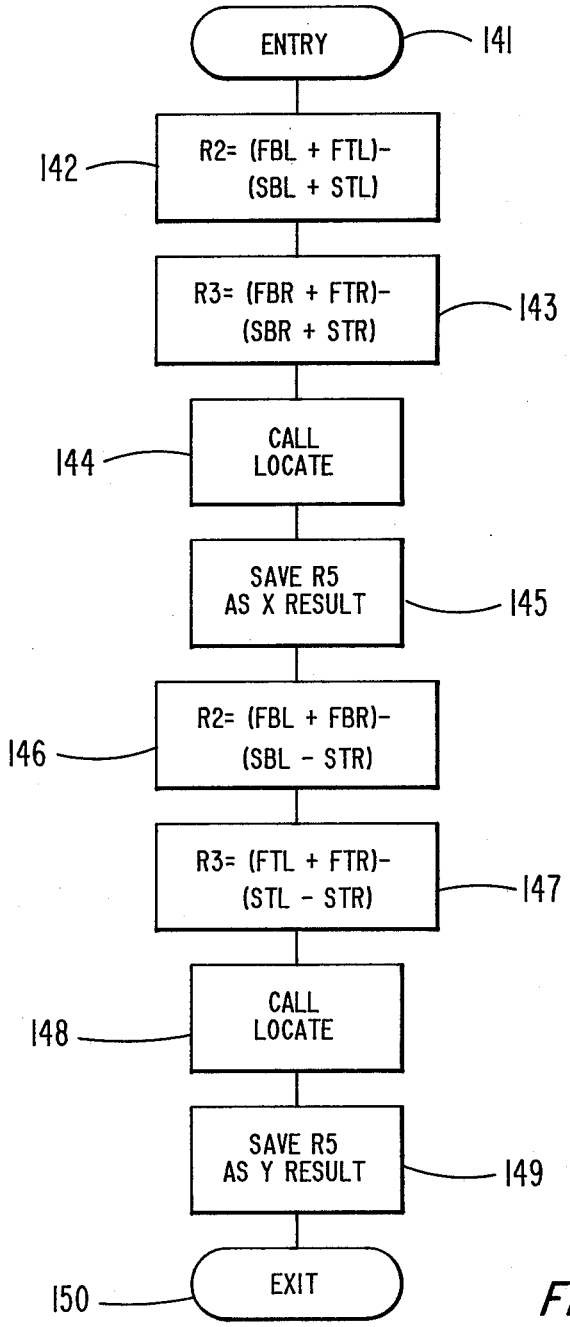
Figure 12:
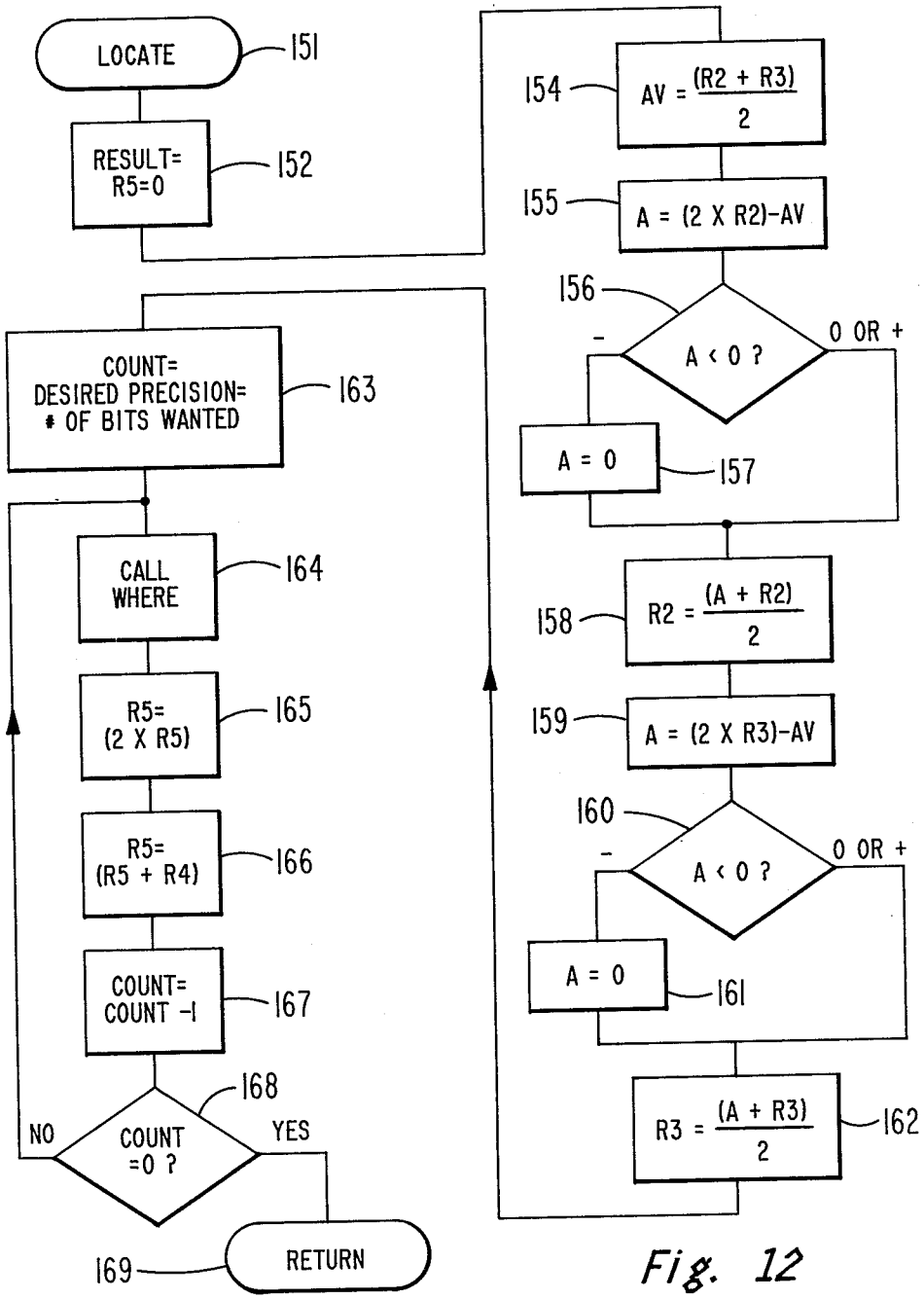
Figure 13:
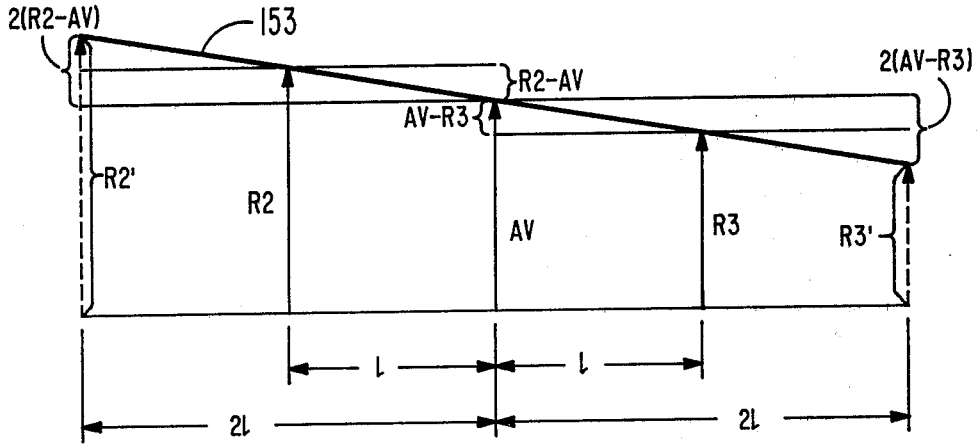
Figure 14:
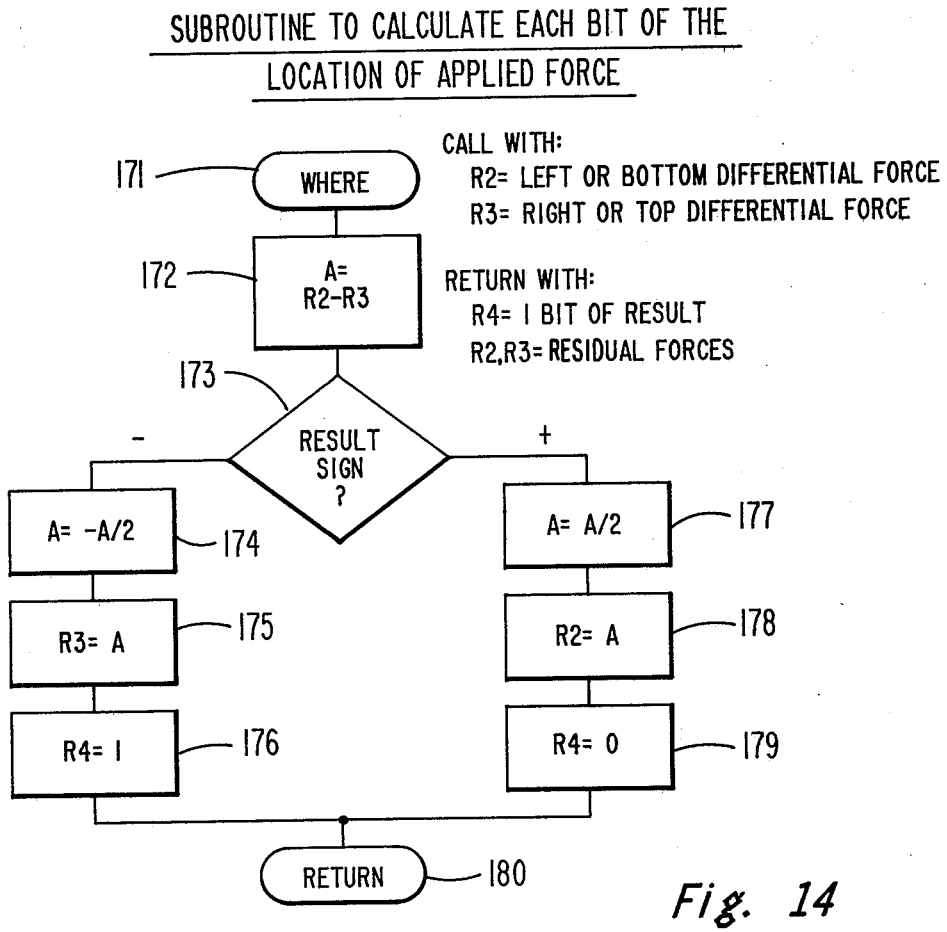

United States Defensive Publication [19] (H) [11] T104,303

Wine [43] Jun. 5, 1984

[54] MECHANICALLY ACTUATED GENERAL INPUT CONTROLS

[76] Inventor: Charles M. Wine, 144 Hamilton Ave., Princeton, N.J. 08540

[21] Appl. No.: 410,857

[22] Filed: Aug. 23, 1982

[51] Int. Cl.[3] ..... G06F 15/20

[52] U.S. Cl. ..... 364/551

[57] ABSTRACT

Changes in the support forces on a structural member when it is touched are used to compute the location of the point at which the structural member is touched.

18 Claims, 12 Sheets Drawing,

47 Pages Specification

The file of this unexamined application may be inspected and copies thereof may be purchased (849 O.G. 1221, Apr. 9, 1968).

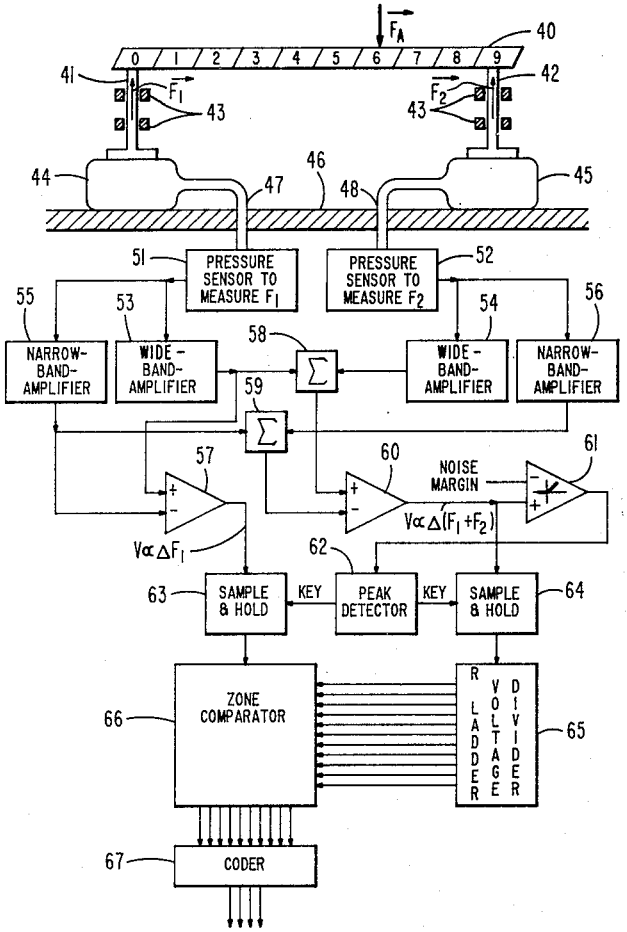

ROUTINE TO MEASURE FORCES BY CAPACITANCE CHARGING TIME

ROUTINE TO COMPUTE LONG-TERM (SLOW) AVERAGES AND SHORT-TERM (FAST) AVERAGES OF EACH OF THE MEASURED FORCES

ROUTINE TO COMPUTE X-Y LOCATION OF POINT OF APPLICATION OF FORCE ON TOUCHPLATE

Enter with SLOW AVERAGES SBL,SBR,STL & STR of measured differential forces for bottom left,bottom right,top left and top right quadrants,respectively, and with corresponding FAST AVERAGES FBL,FBR,FTL & FTR.

SUBROUTINE TO CALCULATE LOCATION OF APPLIED FORCE

CALL WITH: R2=Σ LEFT OR BOTTOM DIFFERENTIAL FORCES
R3=Σ RIGHT OR TOP DIFFERENTIAL FORCES
RETURN WITH: R5= x OR y LOCATION OF FORCE AS BINARY FRACTION

Fig. 15
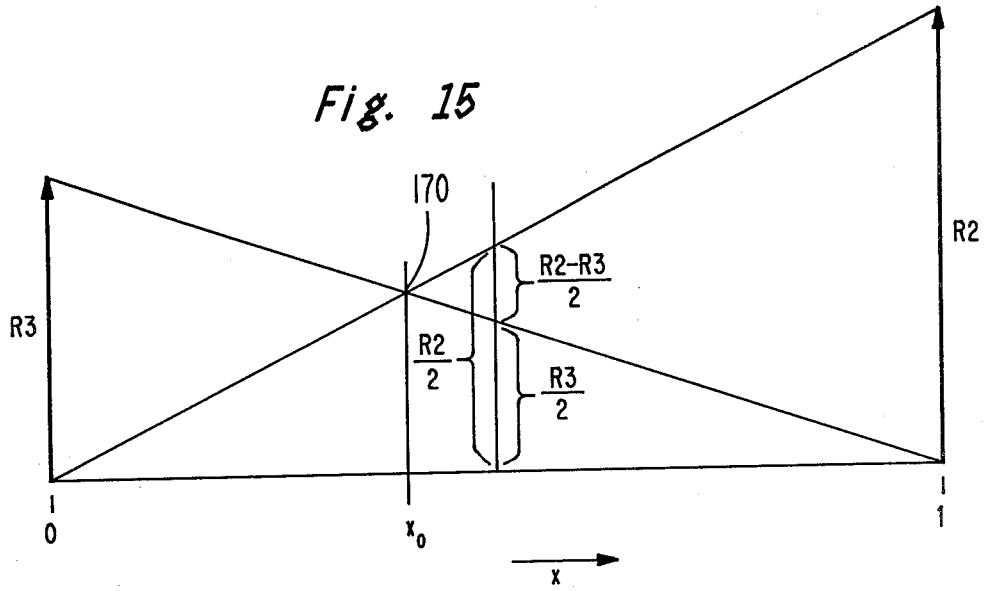
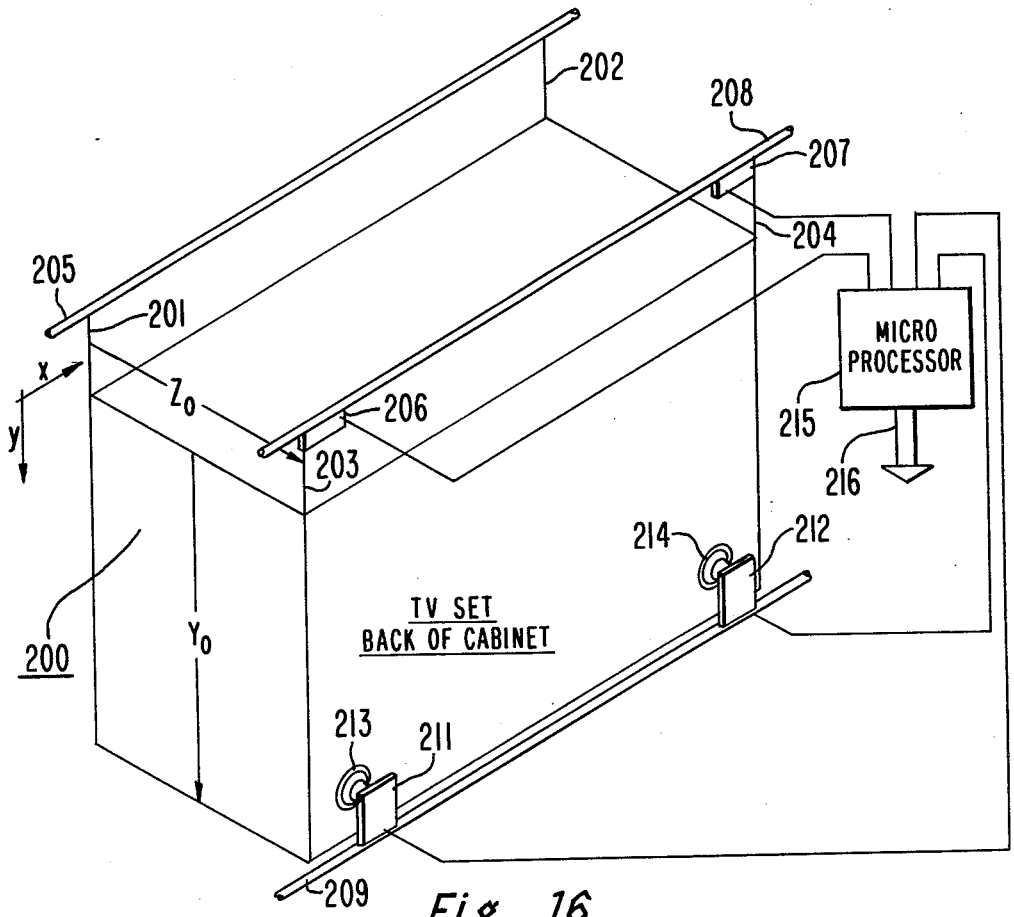
Fig. 16